(12) United States Patent
Heck et al.

(10) Patent No.: US 9,482,535 B2
(45) Date of Patent: Nov. 1, 2016

(54) INTEGRATED SILICON OPTOMECHANICAL GYROSCOPES (OMGS)

(75) Inventors: John Heck, Berkeley, CA (US); Haisheng Rong, Pleasanton, CA (US); Richard Jones, San Mateo, CA (US)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 13/996,669

(22) PCT Filed: Dec. 23, 2011

(86) PCT No.: PCT/US2011/067250
§ 371 (c)(1),
(2), (4) Date: Jun. 21, 2013

(87) PCT Pub. No.: WO2013/095660
PCT Pub. Date: Jun. 27, 2013

(65) Prior Publication Data
US 2013/0293898 A1 Nov. 7, 2013

(51) Int. Cl.
*G01C 19/66* (2006.01)
*G01C 19/5684* (2012.01)

(52) U.S. Cl.
CPC ......... *G01C 19/661* (2013.01); *G01C 19/5684* (2013.01)

(58) Field of Classification Search
CPC .. G01C 19/72; G01C 19/721; G01C 19/722; G01C 19/726; G01C 19/64; G01C 19/727; G01C 19/66; G01C 25/005; G01C 19/5684; G01C 19/667; G01P 3/363; G01P 15/14; G01P 9/02; G01P 21/02
USPC ....... 356/464, 477, 465, 149, 459–460, 469, 356/476; 385/12, 14; 372/94, 87
See application file for complete search history.

(56) References Cited

U.S. PATENT DOCUMENTS

| 4,661,964 A | 4/1987 | Haavisto |
| 4,825,261 A * | 4/1989 | Schroeder ............ G01C 19/727 356/461 |

(Continued)

FOREIGN PATENT DOCUMENTS

| CN | 101320530 | 12/2008 |
| JP | H04-272481 | 9/1992 |

(Continued)

OTHER PUBLICATIONS

"High-Q double-disk microcavities for cavity Optomechanics" to Jiang et al. (2009), retrievable at http://authors.library.caltech.edu/16937/1/Jiang2009p6434Opt_Express.pdf.*

(Continued)

*Primary Examiner* — Tarifur Chowdhury
*Assistant Examiner* — Mohamed K Amara
(74) *Attorney, Agent, or Firm* — Blakely, Sokoloff, Taylor & Zafman LLP

(57) ABSTRACT

A system having an optomechanical gyroscope device. An optomechanical disk acts as an optical ring resonator and a mechanical disk resonator. A drive laser generates an optical drive signal. A drive channel acts as a waveguide for the optical drive signal and includes drive electrodes in a first proximity with respect to the optomechanical disk. The drive electrodes to excite the ring by evanescent coupling. A drive photodetector is configured to receive an output optical signal from the drive channel. A sense laser generates a optical sense signal. A sense channel acts as a waveguide for the optical sense signal and includes sense electrodes in a second proximity with respect to the optomechanical disk. A sense photodetector is configured to receive an output optical signal from the sense channel.

22 Claims, 4 Drawing Sheets

(56) References Cited

U.S. PATENT DOCUMENTS

| | | | | |
|---|---|---|---|---|
| 4,991,922 | A | * | 2/1991 | Dahlgren .............. B24B 19/226 385/50 |
| 5,404,223 | A | * | 4/1995 | Hock ................... G01C 19/662 356/468 |
| 5,420,684 | A | * | 5/1995 | Carroll ................. G01C 19/727 356/461 |
| 6,473,218 | B1 | | 10/2002 | Maleki |
| 6,473,541 | B1 | * | 10/2002 | Ho ........................ B82Y 20/00 385/15 |
| 6,603,558 | B2 | | 8/2003 | Murakowski et al. |
| 6,831,938 | B1 | * | 12/2004 | Gunn, III ........... G02B 6/12004 372/67 |
| 6,901,101 | B2 | * | 5/2005 | Frick .................. G01D 5/35312 250/227.14 |
| 7,043,115 | B2 | * | 5/2006 | Frick ..................... B82Y 20/00 333/219.1 |
| 7,480,425 | B2 | * | 1/2009 | Gunn ................. G02B 6/12007 385/14 |
| 7,583,874 | B2 | * | 9/2009 | Rakich ................. B82Y 20/00 359/346 |
| 7,616,850 | B1 | * | 11/2009 | Watts ................. G02B 6/29335 385/2 |
| 8,111,402 | B2 | * | 2/2012 | Le ...................... G01N 21/7703 356/480 |
| 8,831,056 | B2 | * | 9/2014 | Savchenkov ............. G04F 5/14 372/18 |
| 8,892,127 | B2 | | 11/2014 | Sridhara et al. |
| 9,158,069 | B2 | * | 10/2015 | Kodanev ........... G02B 6/1226 |
| 2002/0015154 | A1 | * | 2/2002 | Goldner .............. G01C 19/722 356/465 |
| 2003/0020918 | A1 | | 1/2003 | Murakowski et al. |
| 2004/0109217 | A1 | | 6/2004 | Maleki |
| 2005/0196103 | A1 | | 9/2005 | Kaplan |
| 2008/0075464 | A1 | | 3/2008 | Maleki |
| 2009/0046294 | A1 | * | 2/2009 | Kaplan ................. G01C 19/72 356/460 |
| 2009/0091763 | A1 | | 4/2009 | Park et al. |
| 2009/0135860 | A1 | | 5/2009 | Maleki |
| 2012/0033225 | A1 | * | 2/2012 | Salit ...................... G01C 19/66 356/469 |
| 2012/0209518 | A1 | * | 8/2012 | Nowak et al. ................ 701/445 |
| 2014/0260614 | A1 | | 9/2014 | Bhave et al. |

FOREIGN PATENT DOCUMENTS

| | | |
|---|---|---|
| JP | H10-221571 | 8/1998 |
| JP | 2007-309937 | 11/2007 |
| JP | 2010-286477 | 12/2010 |
| KR | 20090036507 | 4/2009 |
| KR | 2011/0086760 | 7/2011 |
| TW | 401509 | 8/2000 |

OTHER PUBLICATIONS

"Radiation-pressure-driven micro-mechanical oscillator" to Rokhsari et al.—2005; vol. 13, No. 14 / Optics Express 5293-5301.*

"An Optomechanical Oscillator on a Silicon Chip" to Hossein-Zadeh—2009, IEEE Journal of Selected Topics in Quantum Electronics, vol. 16, No. 1, pp. 276-287.* https://en.wikipedia.org/wiki/Sagnac_effect.* https://en.wikipedia.org/wiki/Resonance.*

Office Action & Search Report for Taiwan Patent Application No. 101145632 mailed Feb. 21, 2014, 13 pages.

Zhao et al., "Investigation and Analysis of a MOEMS Gyroscope based on Novel Resonator", IEEE RCSLPLT and ASOT 2010 10th Russian-Chinese symposium, p. 337-340, Jul. 28, 2010-Aug. 1, 2010.

International Search Report and Written Opinion for PCT/US2011/067250 mailed Jun. 29, 2012, 9 pages.

Zhao, et al. "Investigation and Analysis of a MOEMS Gyroscope based on Novel Resonator," IEEE RCSLPLT and ASOT 2010 10th Russian-Chinese Symposium, pp. 337-340.

International Preliminary Report on Patentability for PCT/US2011/067250 mailed Jul. 3, 2014, 6 pages.

Japanese Patent Application No. 2014-547172 Notice of Reasons for Rejection, Issued Jun. 16, 2015, 4 pages.

Office Action from Counterpart CN Patent Application No. 201180075842.8, Mailed Dec. 3, 2015, 13 pages.

Office Action from Counterpart KR Patent Application No. 2014-7017094, Mailed Feb. 6, 2016, 4 pages.

Notice of First Office Action from the German Patent Trademark Office for German Patent Application No. 112011106020.3 dated Feb. 4, 2016, 5 pages.

* cited by examiner

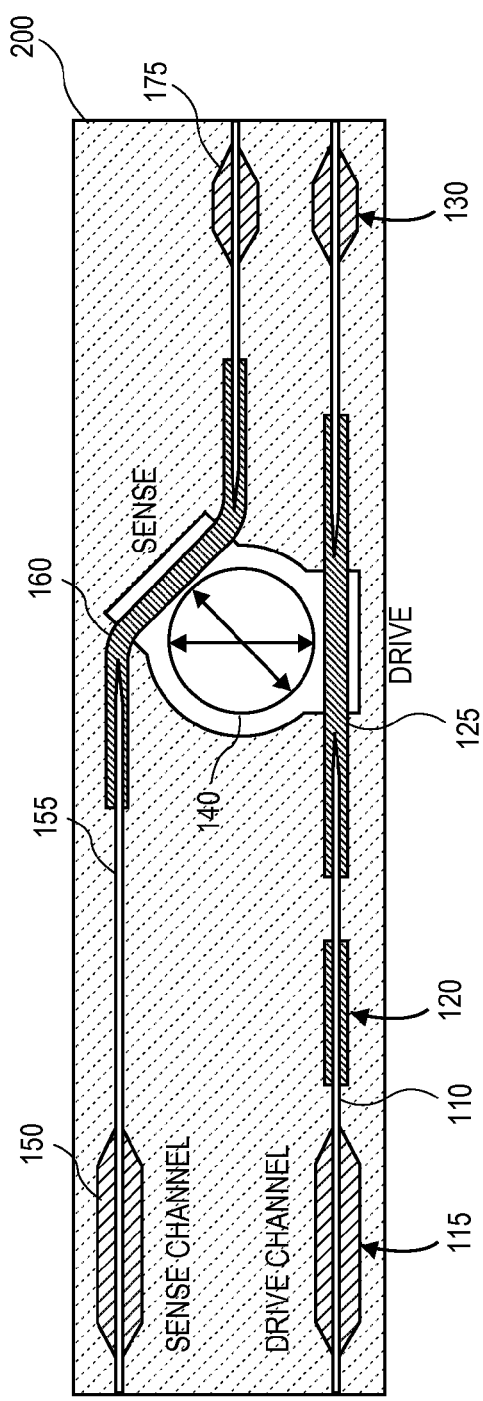
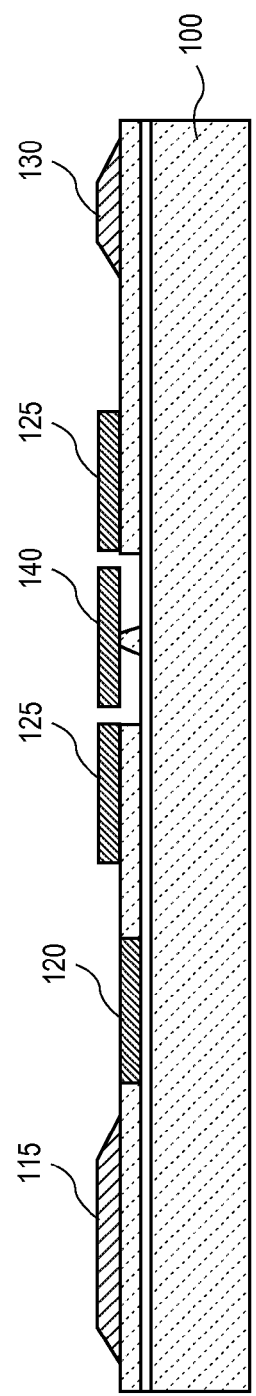

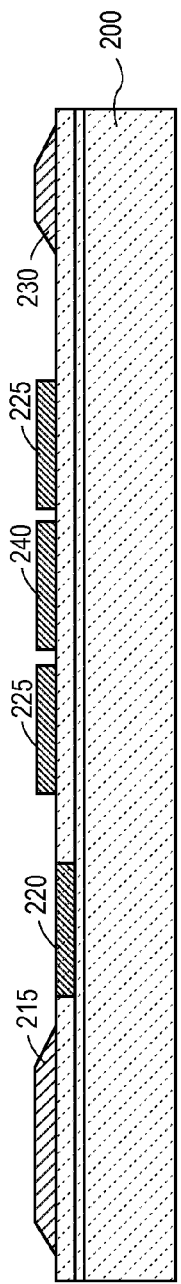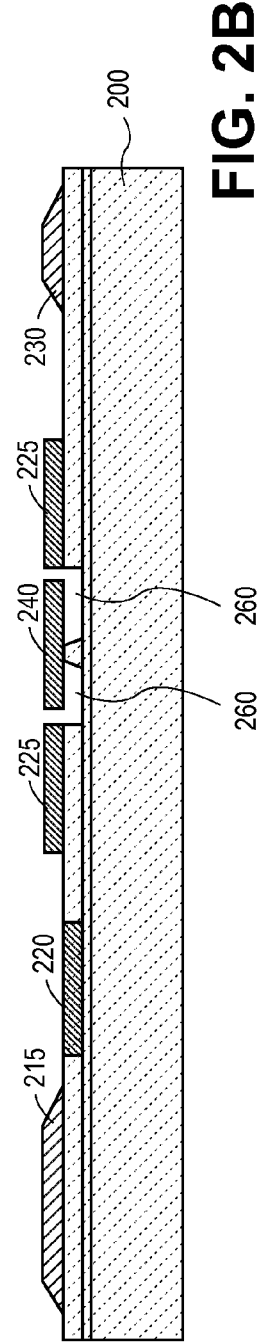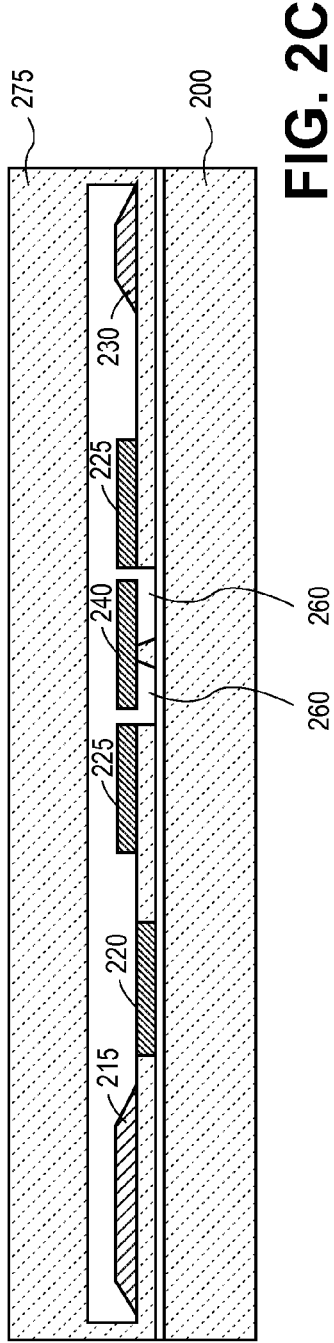

INTEGRATED SILICON OPTOMECHANICAL GYROSCOPES (OMGS)

GOVERNMENT INTEREST STATEMENT

This invention was made with Government support under contract number H98230-10-9-0021 awarded by the Department of Defense. The Government has certain rights in this invention.

TECHNICAL FIELD

Embodiments of the invention relate to optomechanical devices. More particularly, embodiments of the invention relate to optomechanical gyroscopes.

BACKGROUND

Gyroscopes are devices that measure angular rate of movement, which is useful for many applications including dynamic vehicle control, gesture recognition, and navigation, etc. Gyroscope-based systems are currently used in many fields including aerospace navigation, industrial machine monitoring, automobile electronic stability control, handheld devices, etc.

Key measures of gyroscope performance are sensitivity, bandwidth and stability (or bias drift). The highest performance currently can cost up to $1,000,000, are frequently based on optics, and exhibit drift as low as a few degrees/h or better. On the other end of the spectrum, consumer-grade gyroscopes currently cost about $1 per axis, are based on Microelectromechanical systems (MEMS) technologies and suffer from a much higher drift, for example, in the range of 50-100 degrees/h.

For personal navigation, three-axis gyroscopes having drift in the single degrees/h range while maintaining the sensitivity and bandwidth to comprehend both slow and fast angular rotations are desirable. This is fundamentally unattainable using known electrostatic MEMS gyroscopes.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 1a is a top view of one embodiment of an integrated silicon optomechanical gyroscope.

FIG. 1b is a side view of one embodiment of an integrated silicon optomechanical gyroscope.

FIG. 2a is a cross section of one embodiment of a silicon photonic optomechanical gyroscope before a MEMS release.

FIG. 2b is a cross section of one embodiment of a silicon photonic optomechanical gyroscope after a MEMS release.

FIG. 2c is a cross section of one embodiment of a silicon photonic optomechanical gyroscope after wafer level packaging.

DETAILED DESCRIPTION

Figure 3:
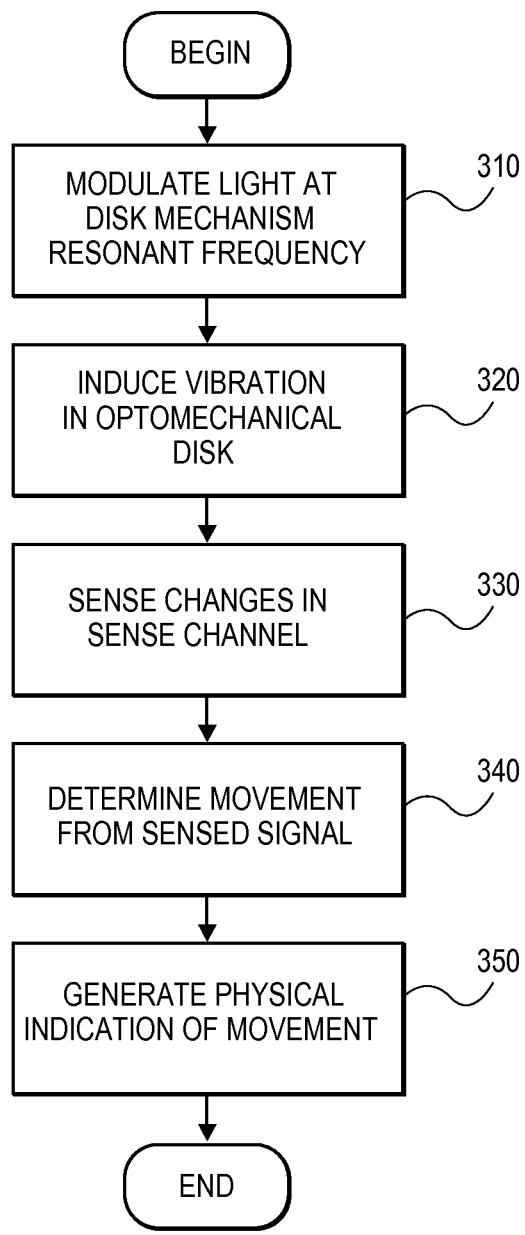
FIG. 3 is a flow diagram of one embodiment of a technique for utilizing an optomechanical gyroscope.

In the following description, numerous specific details are set forth. However, embodiments of the invention may be practiced without these specific details. In other instances, well-known circuits, structures and techniques have not been shown in detail in order not to obscure the understanding of this description.

Described herein are embodiments of a gyroscopes that utilize silicon photonics to enable an optomechanical gyroscope (OMG) with high (e.g., navigation grade) performance and relatively low cost. This OMG utilizes optomechanics to provide optomechanically-transduced inertial sensors (including both gyroscopes and accelerometers) in a relatively low-cost silicon photonics platform.

In various embodiments, the silicon photonic OMG includes a ring resonator that is suspended by a central point. An optical resonance is excited in the ring by evanescent coupling from an adjacent waveguide (a drive channel). By amplitude-modulating the light at the mechanical resonant frequency of the disk, the disk is driven into vibration due to optomechanical forces (either radiation pressure or optical gradient force). Typical mechanical resonant frequencies may be in the range of 100 kHz to 10 MHz.

Once the disk is vibrating mechanically, it acts much like a resonant MEMS sensor. The mode of vibration is perturbed in proportion to the external acceleration (in the case of an accelerometer) or rotation (or Coriolis acceleration, in the case of a gyroscope).

FIG. 1a is a top view of one embodiment of an integrated silicon optomechanical gyroscope. FIG. 1b is a side view of one embodiment of an integrated silicon optomechanical gyroscope. The components of FIGS. 1a and 1b may be manufactured on substrate 100. In one embodiment resistive heaters (not illustrated in the Figures) may be added to the die to maintain a constant temperature of the devices in order to help keep the mechanical and optical properties stable.

Drive laser 115 and sense laser 150 may be hybrid lasers or discrete (external) lasers. The lasers may be any type of laser known in the art. In one embodiment, both drive laser 115 and sense laser 150 may modulate the emanated light at the mechanical resonant frequency of optomechanical disk 140. In another embodiment, optional modulator 120 may be utilized to modulate the light from drive laser 115 to the mechanical resonant frequency of optomechanical disk 140.

Drive laser 115 is optically coupled with drive channel 110, which may include a waveguide. Photodetector 130 is also optically coupled with drive channel 110 to detect light from drive laser 115. Photodetector 130 may be an integrated hybrid photodiode, for example, or a discrete (external) detector.

Sense laser 150 is optically coupled with sense channel 155, which may include a waveguide. Photodetector 175 is also optically coupled with sense channel 155 to detect light from sense laser 150. Photodetector 175 may be an integrated hybrid photodiode, for example, or a discrete (external) detector.

In the example of FIGS. 1a and 1b, separate lasers and photodetectors are used. In an alternate embodiment, a single laser and/or photodetector may be used in conjunction with waveguide splitters to split and combine the optical signal. In one embodiment, the laser may be locked I a feedback lop using the drive photodetector to maintain a consistent lasing wavelength.

In one embodiment, drive electrodes 125 are positioned to induce optical resonance in optomechanical disk 140 by evanescent coupling. When the light from drive laser 115 is modulated at the mechanical resonant frequency of optomechanical disk 140, transduction between drive channel 110 and optomechanical disk 140 at drive electrodes 125 to cause optomechanical disk 140 to resonate.

Once optomechanical disk 140 is resonating, it reacts to physical movement of the substrate upon which it is mounted. The mode of vibration is perturbed in proportion to the external acceleration (in the case of an accelerometer) or rotation (or Coriolis acceleration, in the case of a gyroscope). This change in vibrational mode is detected through evanescent coupling between optomechanical disk 140 and sense electrodes 160 at the node of the drive mode. The detection of a signal at sense photodetector 175 indicates the presence of external motion. The external motion is proportional to the amplitude of the signal. In one embodiment, sense channel 155 is aligned with one or more nodes (e.g., 45°, 135°, 225°,315°) and drive channel 110 is aligned with one or more antinodes (e.g., 0°, 90°, 180°, 270°).

FIG. 2a is a cross section of one embodiment of a silicon photonic optomechanical gyroscope before a MEMS release. The example of FIG. 2a illustrates a cross section view of the optomechanical gyroscope architecture of FIGS. 1a and 1b. Drive laser 215 is configured to provide an optical signal through modulator 220 and SiN couplers 225 to optomechanical disk 240 that has not been released. Photodetector 230 is positioned to receive optical signals.

FIG. 2b is a cross section of one embodiment of a silicon photonic optomechanical gyroscope after a MEMS release. After the MEMS release step(s), cavities 260 exist under optomechanical disk 240. FIG. 2c is a cross section of one embodiment of a silicon photonic optomechanical gyroscope after wafer level packaging. Waver level package 275 illustrated in FIG. 2c may be attached using wafer bonding to encapsulate and regulate the ambient environment of the vibrating disk to ensure a high mechanical quality factor.

FIG. 3 is a flow diagram of one embodiment of a technique for utilizing an optomechanical gyroscope. An optical signal is generated by a laser and modulated at the mechanical resonant frequency of the optomechanical disk, 310. As described above, this may be accomplished by modulating the light with a modulator or the laser may be tuned to generate light with the correct frequency.

The modulated light induces vibration in the optomechanical disk through evanescent coupling, 320. The optomechanical disk then operates as an optical ring resonator and a mechanical disk resonator. Physical movement of the optomechanical disk, for example, by movement of a device containing the optomechanical disk, results in changes in the optical signal received by the sense channel photodetector.

The sense channel photodetector senses changes in the optical signal on the sense channel, 330. Movement of the device is determined from the sensed signal changes, 340. The movement is proportional to the signal sensed by the photodetector. A signal or other indicator is generated to indicate the movement, 350. The signal can be transmitted, or an indication can be stored, or an interface can be modified, or many other actions may be taken in response to the movement.

Figure 4:
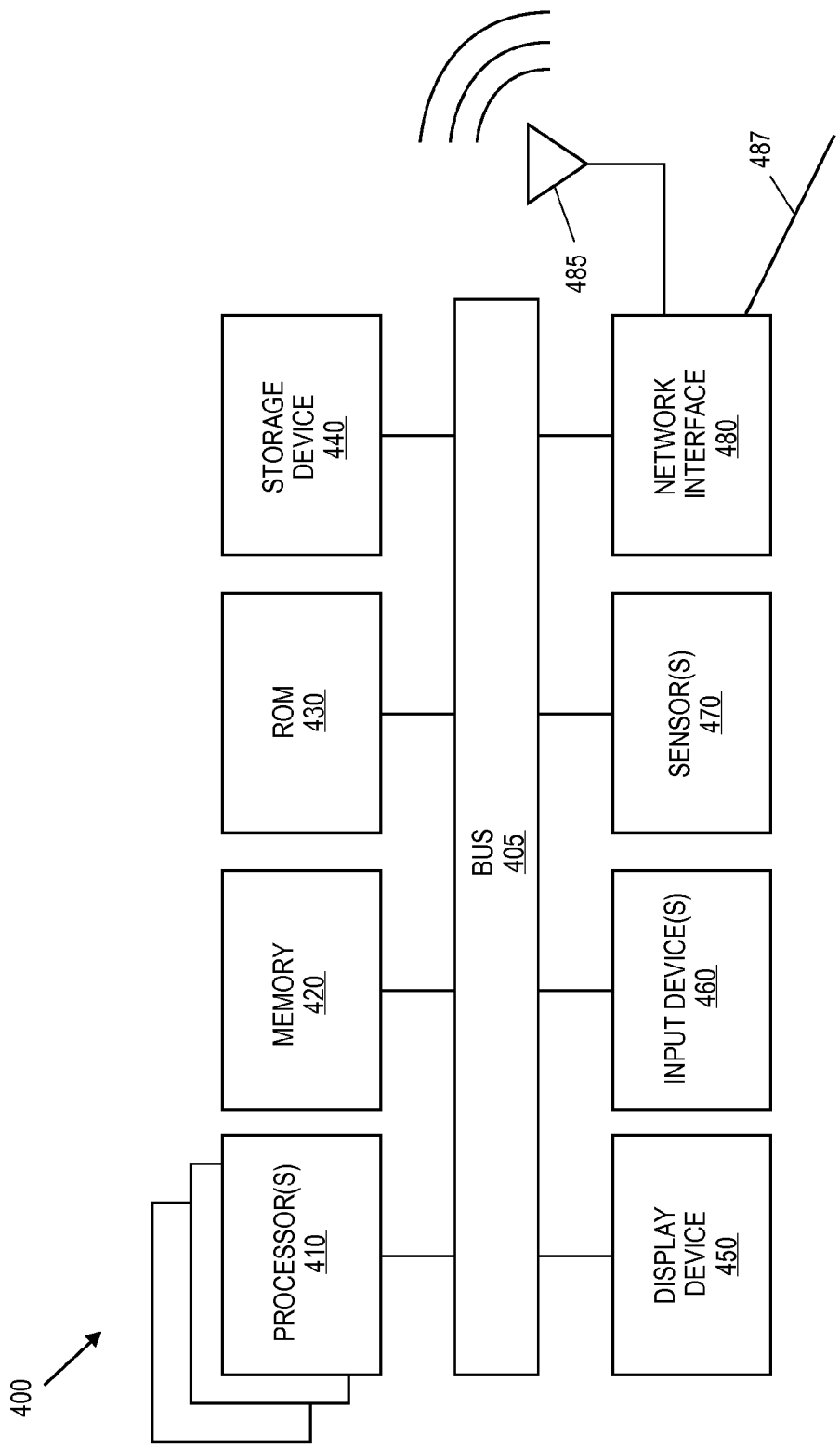
FIG. 4 is a block diagram of one embodiment of an electronic system.

FIG. 4 is a block diagram of one embodiment of an electronic system. The electronic system illustrated in FIG. 4 is intended to represent a range of electronic systems (either wired or wireless) including, for example, a tablet device, a smartphone, a desktop computer system, a laptop computer system, a server, a game console, a game controller, etc. Alternative electronic systems may include more, fewer and/or different components.

Electronic system 400 includes bus 405 or other communication device to communicate information, and processor(s) 410 coupled to bus 405 that may process information. Electronic system 400 may include multiple processors and/or co-processors. Electronic system 400 further may include random access memory (RAM) or other dynamic storage device 420 (referred to as memory), coupled to bus 405 and may store information and instructions that may be executed by processor 410. Memory 420 may also be used to store temporary variables or other intermediate information during execution of instructions by processor(s) 410.

Electronic system 400 may also include read only memory (ROM) and/or other static storage device 430 coupled to bus 405 that may store static information and instructions for processor 410. Data storage device 440 may be coupled to bus 405 to store information and instructions. Data storage device 440 such as a magnetic disk or optical disc and corresponding drive may be coupled to electronic system 400.

Electronic system 400 may also be coupled via bus 405 to display device 450, which can be any type of display device, to display information to a user, for example, a touch screen. Input device 460 may be any type of interface and/or device to allow a user to provide input to electronic system 400. Input device may include hard buttons and/or soft buttons, voice or speaker input, to communicate information and command selections to processor(s) 410.

Electronic system 400 may further include sensors 470 that may be used to support functionality provided by Electronic system 400. Sensors 470 may include, for example, a gyroscope, a proximity sensor, a light sensor, etc. Any number of sensors and sensor types may be supported. In one embodiment, the gyroscope may be the optomechanical gyroscope described herein.

Electronic system 400 further may include network interface(s) 480 to provide access to a network, such as a local area network. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable. Network access may also be provided in accordance with 4G/LTE standards as well.

In one embodiment, network interface(s) 480 may provide access to a local area network, for example, by conforming to IEEE 802.11b and/or IEEE 802.11g and/or IEEE 802.11n standards, and/or the wireless network interface may provide access to a personal area network, for example, by conforming to Bluetooth standards. Other wireless network interfaces and/or protocols, for example, 4G/LTE, can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 480 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification arc not necessarily all referring to the same embodiment. The change in vibrational mode may be detected using evanescent coupling to a sense waveguide (a sense channel) that is designed to be at a node of the drive mode. The detection of a signal at a photodetector in the sense channel indicates the presence of external motion.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
 a silicon substrate;
 an optomechanical disk formed in the silicon substrate that acts as an optical ring resonator and a mechanical disk resonator;
 a drive laser to generate an optical drive signal;
 a drive channel formed as a waveguide in the silicon substrate to act as a waveguide for the optical drive signal, the drive channel comprising drive couplers aligned with a mechanical resonance antinode of the optomechanical disk to excite the optomechanical disk by evanescent coupling, wherein when light from the drive laser is modulated at a mechanical resonance frequency of the optomechanical disk, transduction between the drive couplers and the optomechanical disk causes the optomechanical disk to mechanically resonate in a vibrational mode;
 a drive photodetector formed in the silicon substrate and optically coupled to the drive channel waveguide to receive an output optical signal from the drive channel;
 a sense laser to generate an optical sense signal;
 a sense channel formed as a waveguide in the silicon substrate to act as a waveguide for the optical sense signal, the sense channel comprising sense couplers aligned with a mechanical resonance node of the optomechanical disk for evanescent coupling to the optomechanical disk;
 and
 a sense photodetector formed in the silicon substrate and optically coupled to the drive channel waveguide to receive an output optical signal from the sense channel to detect a change in the vibrational mode of the optomechanical disk through the evanescent coupling with the sense couplers, the change in the vibrational mode being in proportion to external rotation of the optomechanical disk.

2. The apparatus of claim 1 wherein the drive laser modulates light at the mechanical resonant frequency of the optomechanical disk to drive the disk into vibration by optomechanical forces.

3. The apparatus of claim 2 wherein the optomechanical force comprises radiation pressure.

4. The apparatus of claim 2 wherein the optomechanical force comprises an optical gradient force.

5. The apparatus of claim 1 further comprising a modulator formed on the silicon in the drive channel waveguide to modulate the optical drive signal at the mechanical resonant frequency of the optomechanical disk to drive the disk into vibration by optomechanical forces.

6. The apparatus of claim 1, wherein the drive laser is formed in the silicon substrate.

7. A tablet computing device comprising:
 a touch screen interface;
 a silicon substrate;
 an optomechanical disk formed in the silicon substrate that acts as an optical ring resonator and a mechanical disk resonator;
 a drive laser to generate an optical drive signal;
 a drive channel formed as a waveguide in the silicon substrate to act as a waveguide for the optical drive signal, the drive channel comprising drive couplers aligned with a mechanical resonance antinode of the optomechanical disk to excite the optomechanical disk by evanescent coupling, wherein when light from the drive laser is modulated at a mechanical resonance frequency of the optomechanical disk, transduction between the drive couplers and the optomechanical disk causes the optomechanical disk to mechanically resonate in a vibrational mode;
 a drive photodetector formed in the silicon substrate and optically coupled to the drive channel waveguide to receive an output optical signal from the drive channel;
 a sense laser to generate an optical sense signal;
 a sense channel formed as a waveguide in the silicon substrate to act as a waveguide for the optical sense signal, the sense channel comprising sense couplers aligned with a mechanical resonance node of -the optomechanical disk for evanescent coupling to the optomechanical disk;
 a sense photodetector formed in the silicon substrate and optically coupled to the drive channel waveguide to receive an output optical signal from the sense channel to detect a change in the vibrational mode of the optomechanical disk through the evanescent coupling with the sense couplers, the change in the vibrational mode being in proportion to external rotation of the optomechanical disk; and
 a processor coupled to monitor the sense photodetector and the drive photodetector, and coupled with the touch screen interface.

8. The tablet of claim 7 wherein the drive laser modulates light at the mechanical resonant frequency of the optomechanical disk to drive the disk into vibration by optomechanical forces.

9. The tablet of claim 8 wherein the optomechanical force comprises radiation pressure.

10. The tablet of claim 8 wherein the optomechanical force comprises an optical gradient force.

11. The tablet of claim 7 further comprising a modulator to modulate the optical drive signal at the mechanical resonant frequency of the optomechanical disk to drive the disk into vibration by optomechanical forces.

12. The tablet of claim 11 wherein the optomechanical force comprises radiation pressure.

13. The tablet of claim 11 wherein the optomechanical force comprises an optical gradient force.

14. A system comprising:
 an omnidirectional antenna;
 a silicon substrate;

optomechanical disk formed in the silicon substrate that acts as an optical ring resonator and a mechanical disk resonator;

a drive laser to generate an optical drive signal;

a drive channel formed as a waveguide in the silicon substrate to act as a waveguide for the optical drive signal, the drive channel comprising drive couplers aligned with a mechanical resonance antinode of the optomechanical disk to excite the optomechanical disk by evanescent coupling, wherein when light from the drive laser is modulated at a mechanical resonance frequency of the optomechanical disk, transduction between the drive couplers and the optomechanical disk causes the optomechanical disk to mechanically resonate in a vibrational mode;

a drive photodetector formed in the silicon substrate and optically coupled to the drive channel waveguide to receive an output optical signal from the drive channel;

a sense laser to generate an optical sense signal;

a sense channel formed as a waveguide in the silicon substrate to act as a waveguide for the optical sense signal, the sense channel comprising sense couplers aligned with a mechanical resonance node the optomechanical disk for evanescent coupling to the optomechanical disk; and a sense photodetector formed in the silicon substrate and optically coupled to the drive channel waveguide to receive an output optical signal from the sense channel to detect a change in the vibrational mode of the optomechanical disk through the evanescent coupling with the sense couplers, the change in the vibrational mode being in proportion to external rotation of the optomechanical disk; and a processor coupled to monitor the sense photodetector and the drive photodetector, and coupled with a touch screen interface.

15. The system of claim 14 further comprising a touch screen interface.

16. The system of claim 14 wherein the drive laser modulates light at the mechanical resonant frequency of the optomechanical disk to drive the disk into vibration by optomechanical forces.

17. The system of claim 16 wherein the optomechanical force comprises radiation pressure.

18. The system of claim 16 wherein the optomechanical force comprises an optical gradient force.

19. The system of claim 14 further comprising a modulator formed on the silicon in the drive channel waveguide to modulate the optical drive signal at the mechanical resonant frequency of the optomechanical disk to drive the disk into vibration by optomechanical forces.

20. The system of claim 19 wherein the optomechanical force comprises radiation pressure.

21. The apparatus of claim 14, wherein the drive photodetector is an integrated hybrid photodiode.

22. The apparatus of claim 14, further comprising heaters formed on the silicon substrate to maintain a constant temperature of the optomechanical disk.

* * * * *